US012159541B2

(12) United States Patent
Bash et al.

(10) Patent No.: US 12,159,541 B2
(45) Date of Patent: Dec. 3, 2024

(54) SYSTEM AND METHOD FOR DEPLOYING UNMANNED AERIAL VEHICLES WITH RESPECT TO A SINGLE LANDING SITE

(71) Applicant: Flytrex Aviation Ltd., Tel Aviv (IL)

(72) Inventors: Yariv Bash, Tel Aviv (IL); Amit Regev, Tel Aviv (IL)

(73) Assignee: Flytrex Aviation Ltd., Tel Aviv (IL)

( * ) Notice: Subject to any disclaimer, the term of this patent is extended or adjusted under 35 U.S.C. 154(b) by 767 days.

(21) Appl. No.: 16/429,452

(22) Filed: Jun. 3, 2019

(65) Prior Publication Data

US 2019/0378421 A1 Dec. 12, 2019

Related U.S. Application Data

(60) Provisional application No. 62/681,823, filed on Jun. 7, 2018.

(51) Int. Cl.
*G08G 5/00* (2006.01)

(52) U.S. Cl.
CPC ......... *G08G 5/0043* (2013.01); *G08G 5/0008* (2013.01); *G08G 5/0013* (2013.01); *G08G 5/0026* (2013.01)

(58) Field of Classification Search
CPC ........ G08G 5/0043; G08G 5/003; G08G 5/02; G08G 5/04; G08G 5/0069; B64C 2201/00; B64C 2201/18
See application file for complete search history.

(56) References Cited

U.S. PATENT DOCUMENTS

| | | | | |
|---|---|---|---|---|
| 9,809,306 | B2 * | 11/2017 | Stark et al. | B64C 39/024 |
| 9,915,946 | B2 * | 3/2018 | Poole et al. | |
| 2017/0069214 | A1 | 3/2017 | Dupray et al. | |

(Continued)

FOREIGN PATENT DOCUMENTS

| | | |
|---|---|---|
| CN | 102749847 A | 10/2012 |

OTHER PUBLICATIONS

Captain Joe, What is a Holding Pattern? Part 1 Explained by Captain Joe, Apr. 2018. Accessed through Youtube: https://www.youtube.com/watch?v=11sumgn22Uo (Year: 2018).*

(Continued)

*Primary Examiner* — Jaime Figueroa
*Assistant Examiner* — Arslan Azhar
(74) *Attorney, Agent, or Firm* — M&B IP Analysts, LLC

(57) ABSTRACT

A system and method for deploying multiple unmanned aerial vehicles (UAVs) from a single landing site. The method includes: generating a hovering perimeter for a landing site, the hovering perimeter including a plurality of hovering points and a plurality of approach vectors, each hovering point having spatial coordinates and being uniquely associated with one of the plurality of approach vectors, wherein a flight path based on a first approach vector of the plurality of approach vectors does not overlap with a flight path based on a second approach vector of the plurality of approach vectors; and configuring a first UAV of a plurality of UAVs to: navigate to a first hovering point of the plurality of hovering points; hover at the first hovering point; and navigate from the first hovering point to the landing site when the first UAV is authorized to land at the landing site.

27 Claims, 11 Drawing Sheets

(56) References Cited

U.S. PATENT DOCUMENTS

2018/0111683 A1* 4/2018 Benedetto et al. ... B64C 39/024

OTHER PUBLICATIONS

CGTN, Coordinated drones fly in synchronized flocks, YouTube video: https://www.youtube.com/watch?v=MIFtHuXPbv4 (Year: 2017).*
Merriam-Webster.com Dict., Merriam-Webster, https://www.merriam-webster.com/dictionary/deploy (accessed Apr. 19, 2024).*
Merriam-Webster.com Dict., Merriam-Webster, https://www.merriam-webster.com/dictionary/landing (accessed Apr. 19, 2024).*

* cited by examiner

SYSTEM AND METHOD FOR DEPLOYING UNMANNED AERIAL VEHICLES WITH RESPECT TO A SINGLE LANDING SITE

CROSS-REFERENCE TO RELATED APPLICATIONS

This application claims the benefit of U.S. Provisional Application No. 62/681,823 filed on Jun. 7, 2018, the contents of which are hereby incorporated by reference.

TECHNICAL FIELD

The present disclosure relates generally to deploying unmanned aerial vehicles (UAVs), and more specifically to landing multiple UAVs at a single landing site.

BACKGROUND

Unmanned aerial vehicles are increasingly finding uses in civilian and military use, for example to deliver goods. However, infrastructure requirements are difficult to meet, especially in areas where real estate is prime. Therefore, solutions which can efficiently utilize landing sites are useful.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term “some embodiments” or “certain embodiments” may be used herein to refer to a single embodiment or multiple embodiments of the disclosure.

Certain embodiments disclosed herein include a method for deploying multiple unmanned aerial vehicles (UAVs) from a single landing site. The method comprises: generating a hovering perimeter for a landing site, the hovering perimeter including a plurality of hovering points and a plurality of approach vectors, each hovering point having spatial coordinates and being uniquely associated with one of the plurality of approach vectors, wherein a flight path based on a first approach vector of the plurality of approach vectors does not overlap with a flight path based on a second approach vector of the plurality of approach vectors; and configuring a first UAV of a plurality of UAVs to: navigate to a first hovering point of the plurality of hovering points; hover at the first hovering point; and navigate from the first hovering point to the landing site when the first UAV is authorized to land at the landing site.

Certain embodiments disclosed herein also include a non-transitory computer readable medium having stored thereon causing a processing circuitry to execute a process, the process comprising: generating a hovering perimeter for a landing site, the hovering perimeter including a plurality of hovering points and a plurality of approach vectors, each hovering point having spatial coordinates and being uniquely associated with one of the plurality of approach vectors, wherein a flight path based on a first approach vector of the plurality of approach vectors does not overlap with a flight path based on a second approach vector of the plurality of approach vectors; and configuring a first UAV of a plurality of UAVs to: navigate to a first hovering point of the plurality of hovering points; hover at the first hovering point; and navigate from the first hovering point to the landing site when the first UAV is authorized to land at the landing site.

Certain embodiments disclosed herein also include a system for deploying multiple unmanned aerial vehicles (UAVs) from a single landing site. The system comprises: a processing circuitry; and a memory, the memory containing instructions that, when executed by the processing circuitry, configure the system to: generate a hovering perimeter for a landing site, the hovering perimeter including a plurality of hovering points and a plurality of approach vectors, each hovering point having spatial coordinates and being uniquely associated with one of the plurality of approach vectors, wherein a flight path based on a first approach vector of the plurality of approach vectors does not overlap with a flight path based on a second approach vector of the plurality of approach vectors; and configure a first UAV of a plurality of UAVs to: navigate to a first hovering point of the plurality of hovering points; hover at the first hovering point; and navigate from the first hovering point to the landing site when the first UAV is authorized to land at the landing site.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
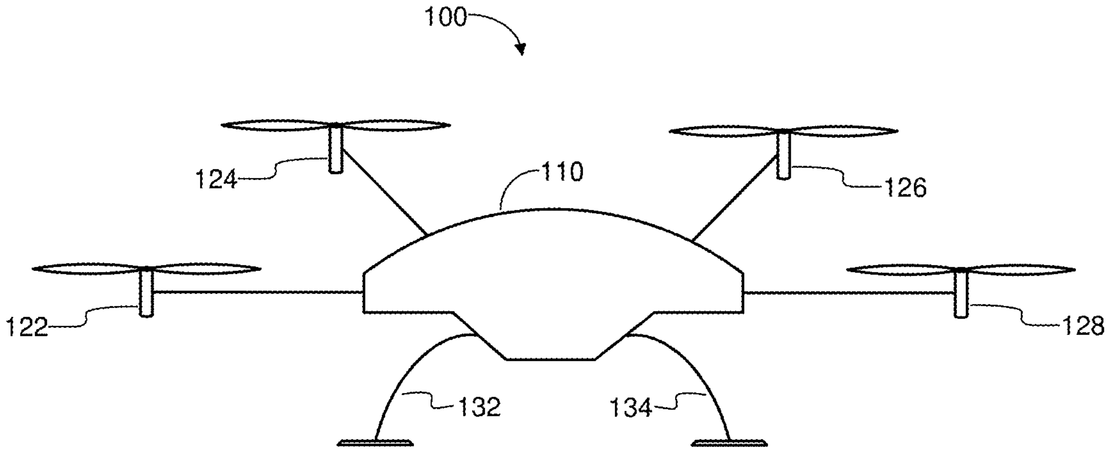
FIG. 1 is a schematic illustration of an unmanned aerial vehicle (UAV).

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that it is beneficial to operate multiple drones from a single landing site given the cost of real estate. However, use of a single landing site may create a bottleneck in which drones approach the landing site at the same time, which in turn may result in collisions between the approaching drones. The various disclosed embodiments provide a solution including generating one or more hovering points in proximity to the landing site and configuring each drone to wait at a hovering point until the drone is authorized to approach the landing site. Thus, collisions may be reduced without requiring additional landing sites.

The various disclosed embodiments include a method and system for deploying multiple unmanned aerial vehicles with respect to a single landing site. A hovering perimeter including multiple hovering points is generated for a landing site. Each hovering point is a location having respective spatial coordinates and an approach vector such that a flight path based on the approach vector of one hovering point does not overlap with a flight path based on the approach vector of another hovering point.

When the hovering perimeter has been generated, an unmanned aerial vehicle (UAV) is instructed to navigate to an assigned hovering point. The UAV is further instructed to hover at the assigned hovering point until an authorization to land at the landing site is received. In some implementations, the UAV may be instructed to land at the landing site when the landing authorization is received.

FIG. 1 is an example schematic illustration of an unmanned aerial vehicle (UAV) 100 that may be utilized in accordance with various disclosed embodiments. The UAV 100 includes a body 110 for housing a controller (e.g., the UAV control system 300, not shown in FIG. 1). The controller may include or be coupled to a communication circuit (e.g., the communication interface 230, not shown in FIG. 1) for communicating with a control server (not shown) or with one or more other UAVs.

In the example UAV 100, the body 110 is coupled to a first rotor 122, a second rotor 124, a third rotor 126, and a fourth rotor 128. Typically, one pair of rotors (for example, the first rotor 122 and the third rotor 126) will turn clockwise, while a second pair of rotors (for example, the second rotor 124 and the fourth rotor 128) will turn counter-clockwise. In an example implementation, the rotors have a fixed pitch such that height, yaw, pitch, and roll are adjusted by applying a thrust to each rotor as the situation requires. In some implementations, the UAV 100 may include a plurality of rotors greater than four, however four are shown here for simplicity, and one skilled in the art would not read this as limiting the disclosure to quadcopters.

In some implementations, the UAV 100 may further include a pair of landing skids 132 and 134. The landing skids may be equipped with dampers such as a damper 136. Dampers assist with shock absorption from landing the UAV, thereby protecting a UAV payload, the controller, and the like. A UAV controller may include a positioning system and various sensors, such as one or more of altitude sensors, accelerometers, imaging devices, temperature sensors, compasses, magnetometers, and the like.

Figure 2:
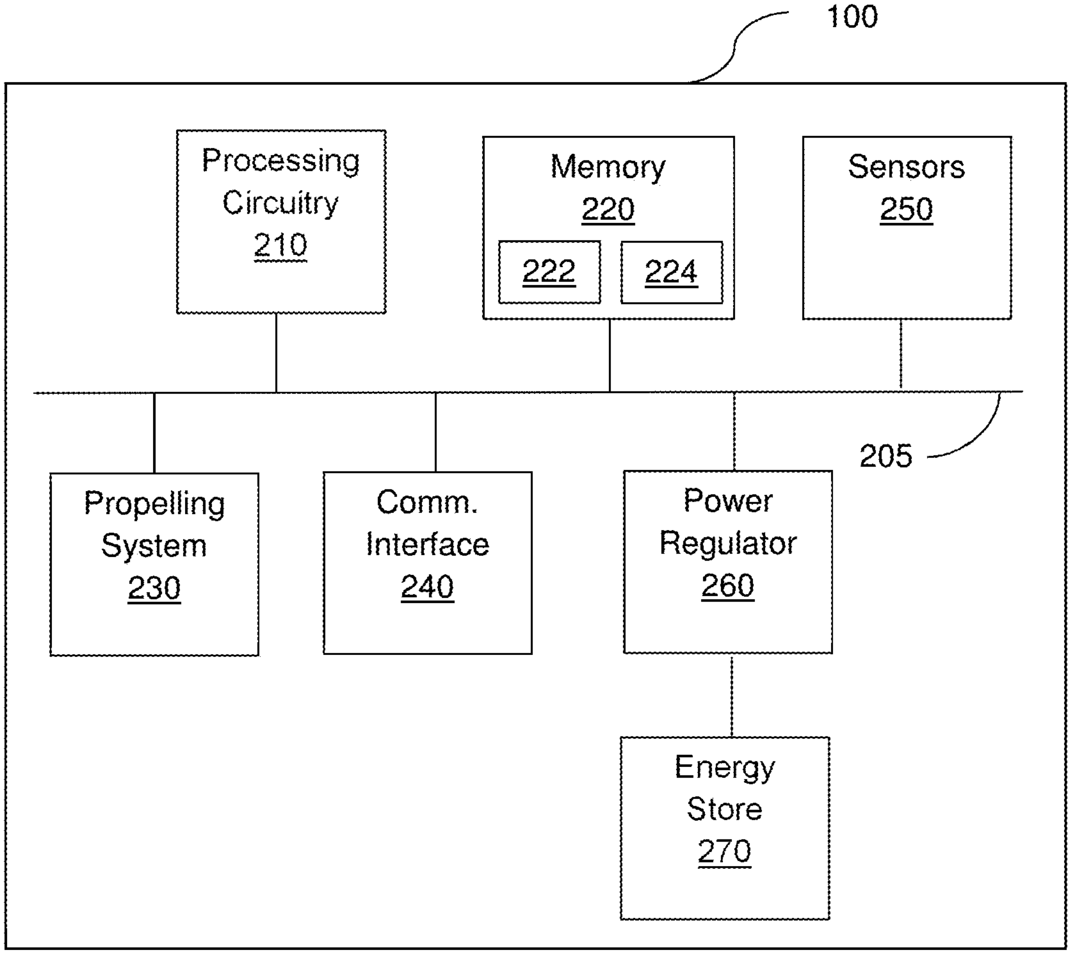
FIG. 2 is a block diagram of components of an UAV.

FIG. 2 is an example block diagram illustrating components of the UAV 100. The components of the UAV 100 include a control system 210, a propelling system 220, a communications interface 230, sensors 240, and a power regulator 250. In an example implementation, the components of the UAV 100 may be connected via a bus 205.

The UAV 100 is configured to perform one or more of the embodiments disclosed herein. To this end, the UAV 100 includes at least the processing circuitry 210 and the memory 220. The memory 220 stores instructions that, when executed by the processing circuitry, configure the UAV 100 to act according to the disclosed embodiments. Specifically, the memory 220 stores instructions from a UAV control system (e.g., the UAV control system 300, FIG. 3) for configuring the UAV 100 to hover at a hovering point, to land, to await authorization before landing, and the like.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. The memory 220 may be further used as a working scratch pad for the processing circuitry 210, a temporary storage, and the like.

The memory 220 may further include a memory portion 222 storing software and a memory portion 224 storing a navigation plan and data identifying one or more assigned hovering points as described herein. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, cause the processing circuitry 210 to perform the various processes described herein.

The propelling system 230 is configured for causing locomotion or other physical movement of the UAV 100. The propelling system 230 may include or be connected to one or more motors, propellers, engines, and the like. For example, the propelling system 230 may include, for example, the rotors 122, 124, 126, and 128 of FIG. 1.

The communication interface 240 provides network connectivity for the UAV 100. The communication interface 240 may include various transceivers, enabling communication via, for example, satellite, radio frequency (RF) channels (e.g., LoRa and SIGFOX), cellular networks, and the like.

The sensors 250 include one or more of any sensors such as, but not limited to, altitude sensors, accelerometers, imaging devices, temperature sensors, compasses, magnetometers, positioning systems, and the like.

The power regulator 260 is configured for supplying electric power to the various system and subsystems thereof. The power regulator 260 is coupled with an energy store 270, such as a battery which holds a charge.

Figure 3:
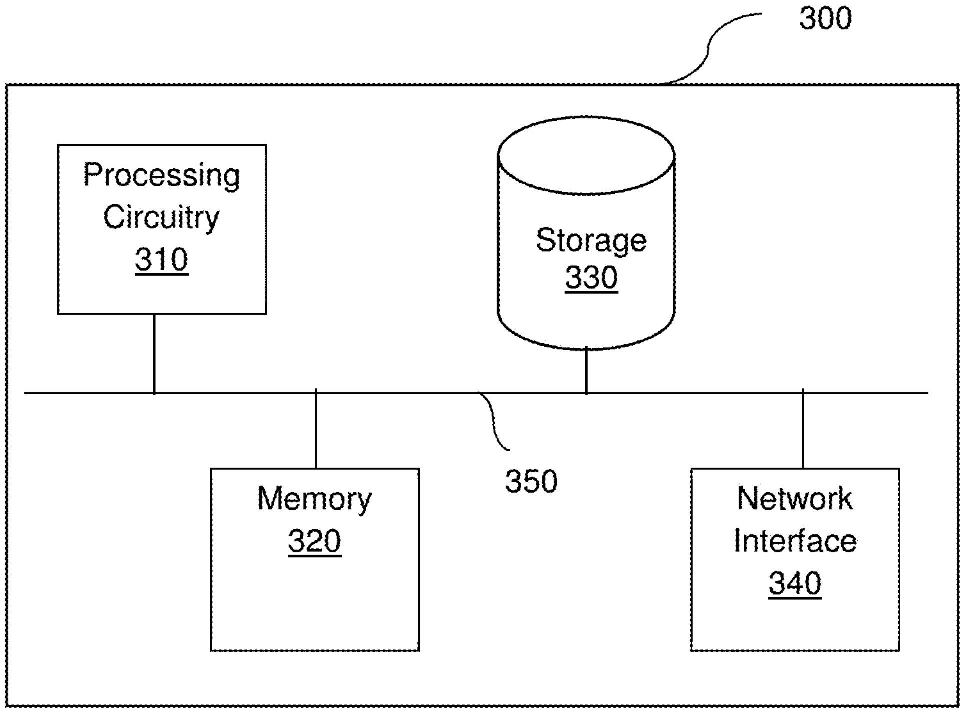
FIG. 3 is a block diagram of an UAV control system according to an embodiment.

FIG. 3 is an example schematic diagram of a UAV control system 300 according to an embodiment. The UAV control system 210 includes a processing circuitry 310 coupled to a memory 320, a storage 330, and a network interface 340. In an embodiment, the components of the UAV control system 210 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof. The memory 220 may be further used as a working scratch pad for the processing circuitry 210, a temporary storage, and the like. The memory 220 may further include a memory portion 224 storing a navigation plan and data identifying one or more assigned hovering points as described herein.

In one configuration, computer readable software for implementing one or more embodiments disclosed herein may be stored in the storage 330. In another configuration, the memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein. Specifically, the UAV control system 300 is configured to assign hovering points to UAVs and to configure such UAVs to wait at their respective hovering points until they are authorized to land at a landing site.

The storage 330 may be magnetic storage, optical storage, and the like, and may be realized, for example, as flash memory or other memory technology, CD-ROM, Digital Versatile Disks (DVDs), or any other medium which can be used to store the desired information.

The network interface 340 allows the UAV control system 300 to communicate with, for example, other UAVs, control servers, and the like. The communication may be over one or more networks such as, but not limited to, a wireless, cellular or wired network, a local area network (LAN), a wide area network (WAN), a metro area network (MAN), the Internet, the worldwide web (WWW), similar networks, and any combination thereof.

In some embodiments, the UAV control system 300 may be configured with control capabilities described in more detail in U.S. patent application Ser. No. 15/646,729, assigned to the common assignee, the contents of which are hereby incorporated by reference.

It should be understood that the embodiments described herein are not limited to the specific architecture illustrated in FIG. 3, and other architectures may be equally used without departing from the scope of the disclosed embodiments.

It should be noted that the UAV 100 described with respect to FIGS. 1 through 3 is used for example purposes but that UAVs utilized in accordance with the disclosed embodiments are not limited to the particular configurations shown therein.

Figure 4A:
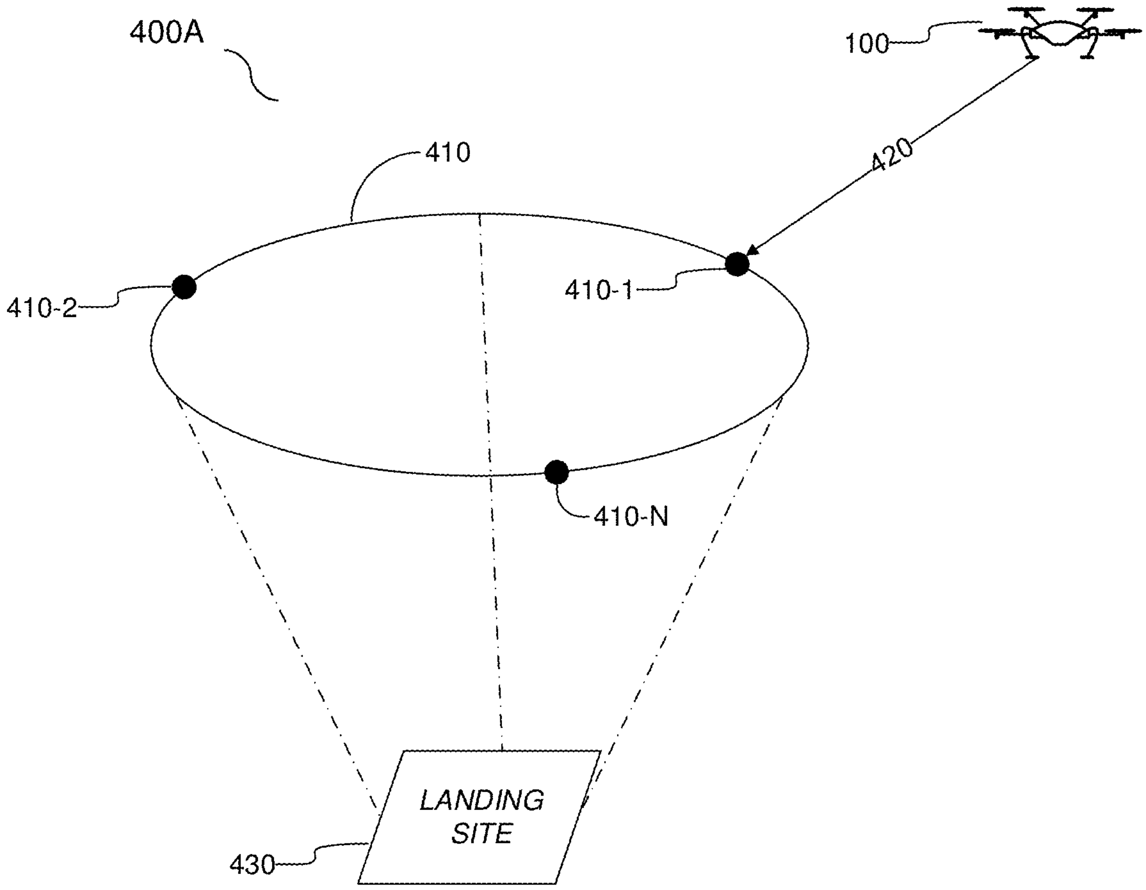
FIG. 4A is a schematic illustration of a landing site and a hovering perimeter.

FIG. 4A is an example schematic illustration 400A of a landing site and a hovering perimeter. The example schematic illustration 400A visually represents a hovering perimeter 410 generated for a landing site 430.

The hovering perimeter 410 is generated by a UAV control system (e.g., the UAV control system 210). The hovering perimeter 410 includes hovering points 410-1 through 410-N (where N is an integer greater than or equal to 2) in a discrete or continuous arrangement. In the example illustration 400A, the hovering points 410 correspond to points on a circular hovering perimeter on which the UAV 100 may hover while awaiting authorization to land at the landing site 430.

The UAV 100 approaches the hovering perimeter 410 at a vector 420, hovering at an assigned hovering point 410-1 corresponding to a spatial coordinate along the hovering perimeter 410. The UAV 100 remains in the hovering perimeter 410 at the assigned hovering point 410-1 until authorization for landing at the landing site 430 is received. The authorization may be received, for example, by establishing communications between the UAV 100 and one or more other UAVs (not shown) hovering on the hovering perimeter 410 (e.g., at any of the hovering points 410-2 through 410-N), and determining an order of descent among the UAVs. In another embodiment, the UAV control system 300 (for example a UAV control system deployed at the landing site 430, not shown in FIG. 4A) may determine an order of descent. Order of descent may be further determined based on a condition of the UAVs, for example, battery charge level (indicative of the amount of time the UAV is able to maintain hovering), time to next delivery, and the like.

Figure 4B:
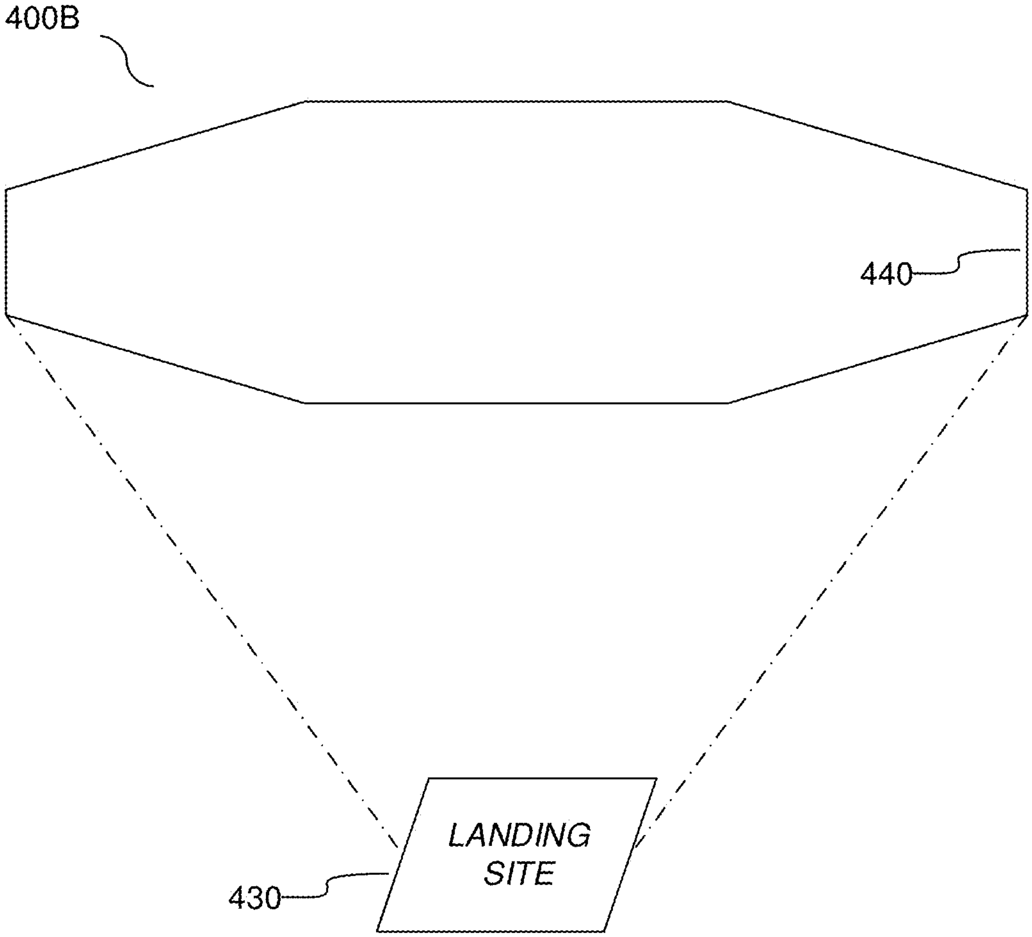
FIG. 4B is a schematic illustration of a landing site and an alternative hovering perimeter.

FIG. 4B is an example schematic illustration 400B of a landing site and an alternative hovering perimeter. The example schematic illustration 400B visually represents another hovering perimeter 440 generated for the landing site 430.

In this example implementation, a plurality of spatial coordinates is arranged on a polygon-shaped hovering perimeter 440. In the example implementation shown in FIG. 4B, the polygon is an octagon. It should be noted that the hovering perimeter does not need to be an octagon specifically or an equal-sided polygon more generally. Rather, when determining a hovering perimeter, spatial points should be selected by the control system (e.g., the control system 300) such that an approach vector can be planned for each UAV which would not interrupt an approach vector of another UAV. The control system may further determine spacing (i.e. distance) between spatial points on the hovering perimeter.

In certain embodiments, a UAV may takeoff from the landing site 430 through the same assigned hovering point (not shown in FIG. 4B) through which it hovers before landing at the landing site 430. Preferably, the hovering perimeter 440 includes hovering points at which wireless communication between the landing site 430 and a UAV is possible, for example, hovering points at which data may be transmitted to and received from a control system deployed at the landing site 430. In other embodiments, the hovering perimeter includes hovering points at which line-of-sight communication is possible with a UAV from the landing site 430.

Figure 5A:
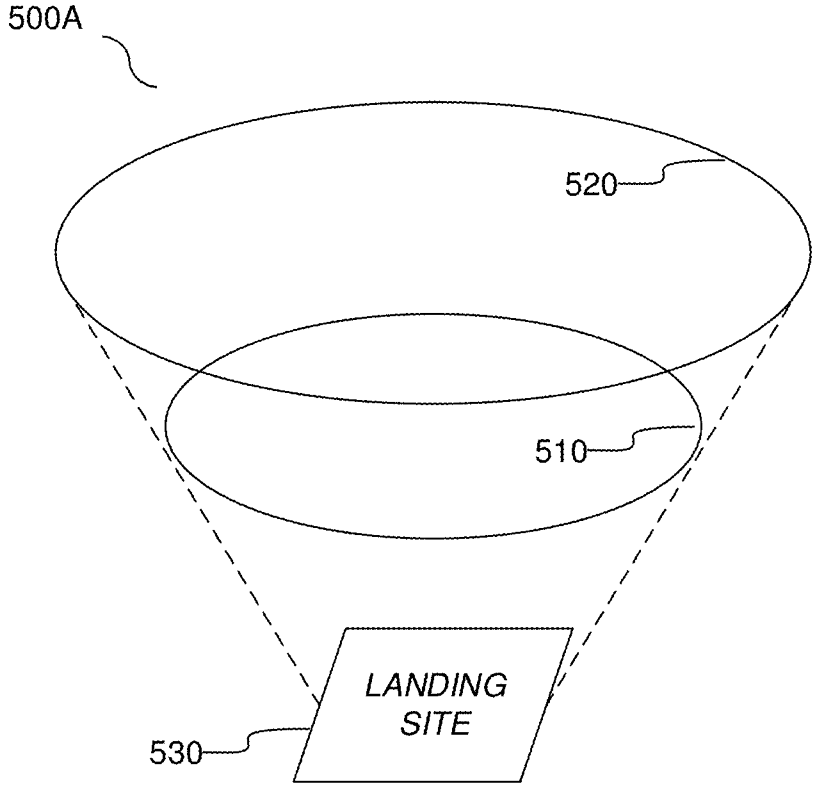
FIG. 5A is a schematic illustration of a landing site having a plurality of hovering perimeters.
Figure 5B:
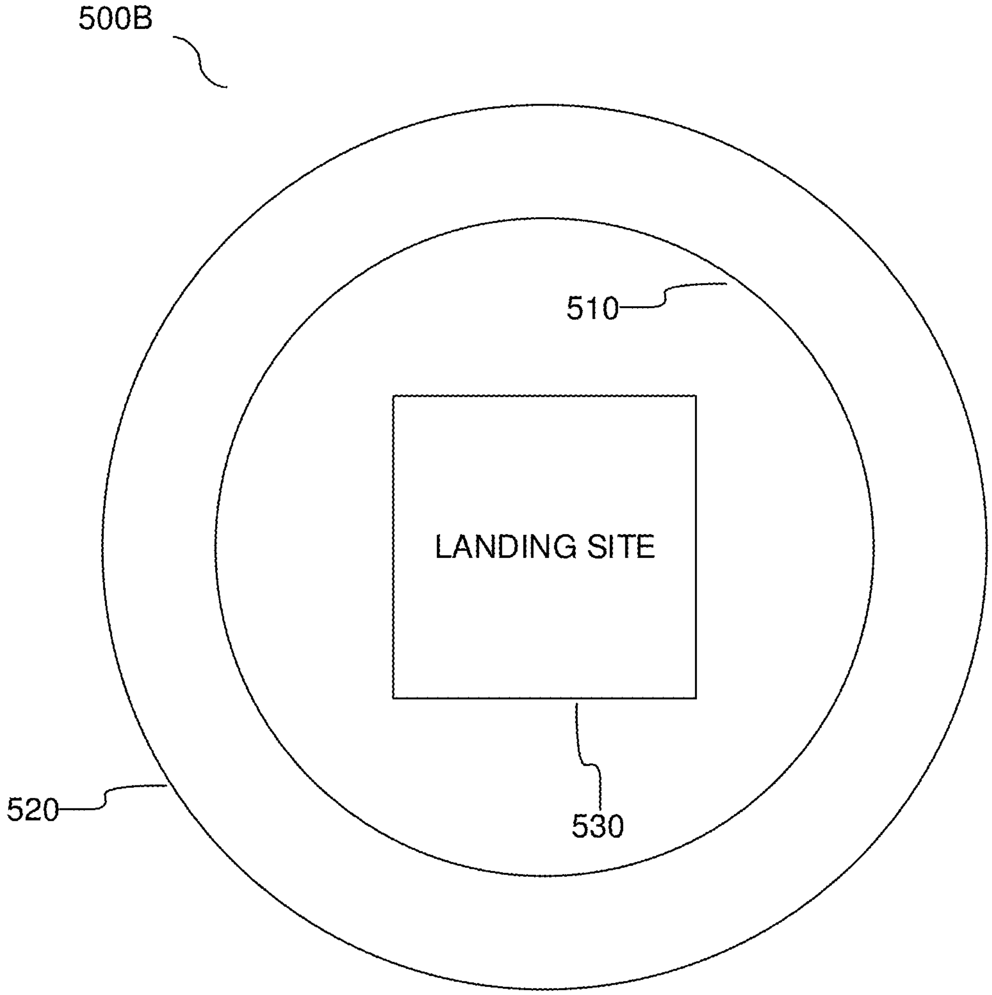
FIG. 5B is a top view schematic illustration of a landing site having a plurality of hovering perimeters.

FIG. 5A is an example schematic illustration 500A of a landing site 530 having a plurality of hovering perimeters 510 and 520. FIG. 5B is an example top view schematic illustration 500B of the landing site 530.

A plurality of hovering perimeters, such as the first hovering perimeter 510 and the second hovering perimeter 520 are generated over a landing site 530 such that the landing site 530 is at least partially within the area of either or both hovering perimeters 510 and 520. The hovering perimeters in this embodiment are generated such that each point on the first hovering perimeter 510 is closer in distance to the landing site 530 than each point of the second hovering perimeter 520 and such that the first hovering perimeter 510 has a smaller radius than the second hovering perimeter 520.

While FIGS. 5A-B show two hovering perimeters, it is understood that any number of hovering perimeters may be used without departing from the scope of this disclosure. Furthermore, the hovering perimeters in this embodiment are generated such that the height of each point in the first perimeter 510 is lower than the height of each point of the second perimeter 520. In some embodiments, hovering points may further be determined based on landscape. For example, a hovering perimeter may include coordinates which are above an empty field, a high-rise building, a school, a hospital, and the like. The hovering points may be generated such that certain areas (or arcs, in this case) are prioritized over others. For example, a single point may be allowed over a populated building, none over a school or hospital, and there may be no limitations on hovering points generated above an empty field.

Figure 6:
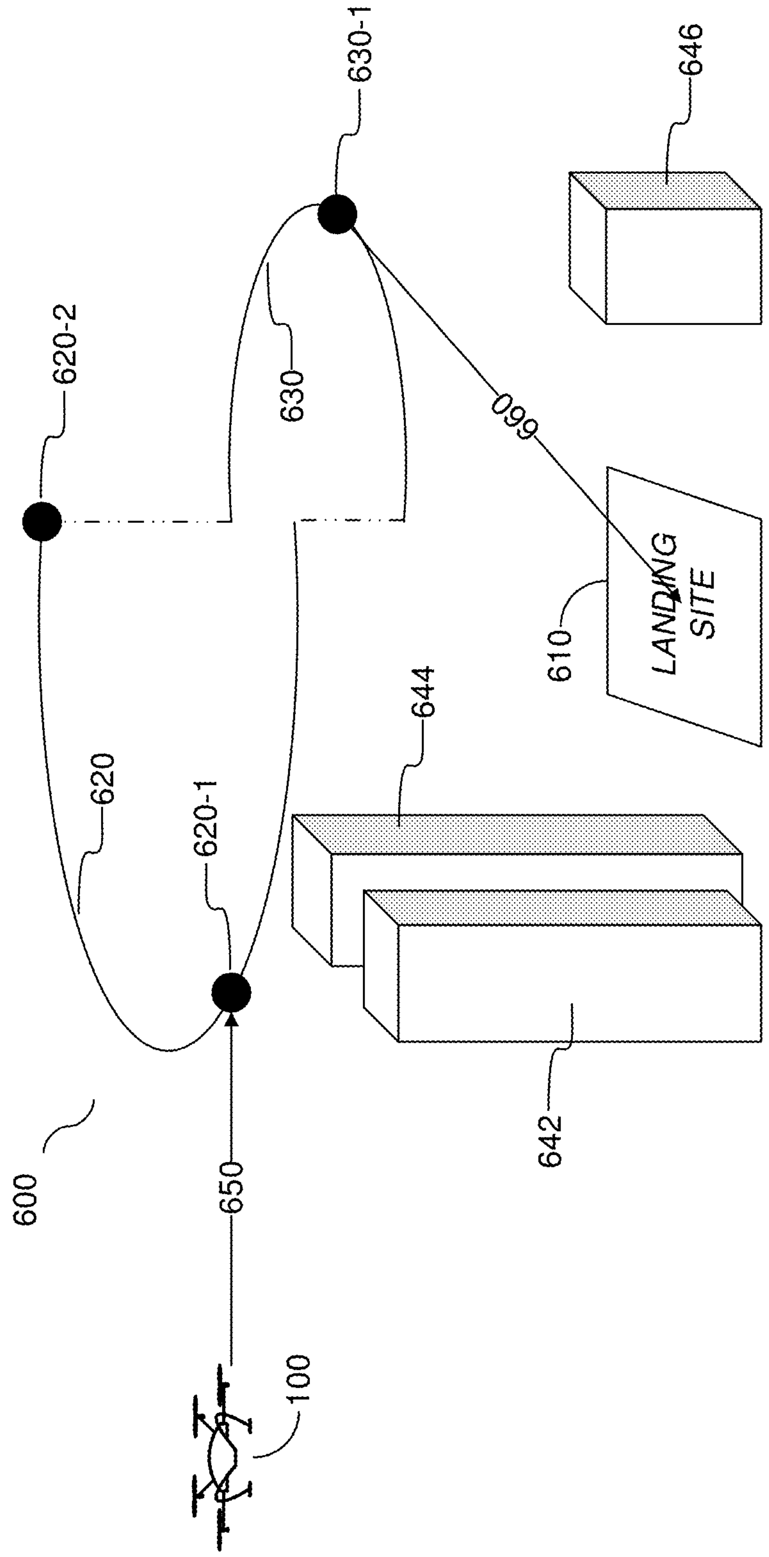
FIG. 6 is a schematic illustration of a landing site having an irregular hovering perimeter.

FIG. 6 is an example schematic illustration 600 of an irregular hovering perimeter over a landing site. A landing site 610 is positioned under a hovering perimeter including a first section 620 and a second section 630. The first section 620 includes hovering points (represented by hovering points 620-1 and 620-2) which are generated at a height greater than the height of hovering points of the second section 630 (represented by a hovering point 630-1).

Utilizing an irregular hovering perimeter may allow for adjusting hovering for an obstacle that may require the hovering perimeter height to be different in various areas. In the example implementation shown in FIG. 6, the height of high-rise buildings 642 and 644 does not allow the first section 620 and the second section 630 of the hovering perimeter to be of the same height. Therefore, the height of hovering points of the first section 620 are dictated in part by the presence of the high-rise buildings 642 and 644, whereas hovering points of the second section 630 are dictated in part by a smaller building 646.

In various implementations, UAVs may shift from a first hovering point to a second hovering point when this would be beneficial. For example, it may be deemed more safe to hover over the smaller building at hovering point 630-1 than over a high rise building at 620-1.

As a non-limiting example, the UAV 100 approaches hovering point 620-1 at an approach vector 650. The UAV 100 then hovers at hovering point 620-1 until it receives landing authorization (or instructions) from the landing site 610 or from the control system 300 deployed at the landing site 610. The UAV 100 may hover along the perimeter, for example, clockwise or counter-clockwise. When it is beneficial to shift hovering points, the UAV 100 may move from hovering point 620-1 to hovering point 620-2, and may further move from hovering point 620-2 to hovering point 630-1.

When the UAV 100 receives authorization to land while at hovering point 630-1 (or otherwise makes a determination to land at the landing site 610), the UAV 100 approaches the landing site at an approach vector 660. It should be readily understood that the approach vector, while shown in FIG. 6 as a straight line, can in fact include any number of lines, curves, or other path shapes which the UAV 100 follows on its descent path.

In certain embodiments, the UAV 100 may be configured (e.g., by the control system 300) to perform an emergency landing below a hovering point. For example, it may be determined that the UAV 100 at hovering point 630-1 is not able to approach the landing site. This can be due to failure in communication with the landing site or control server, to low power or fuel levels, and the like. The UAV 100 would then begin to descend to the roof of high rise building 646, thereby performing an emergency landing on the building's roof. This decreases the likelihood of damage or injury to people from a UAV landing over a populated area.

Figure 7:
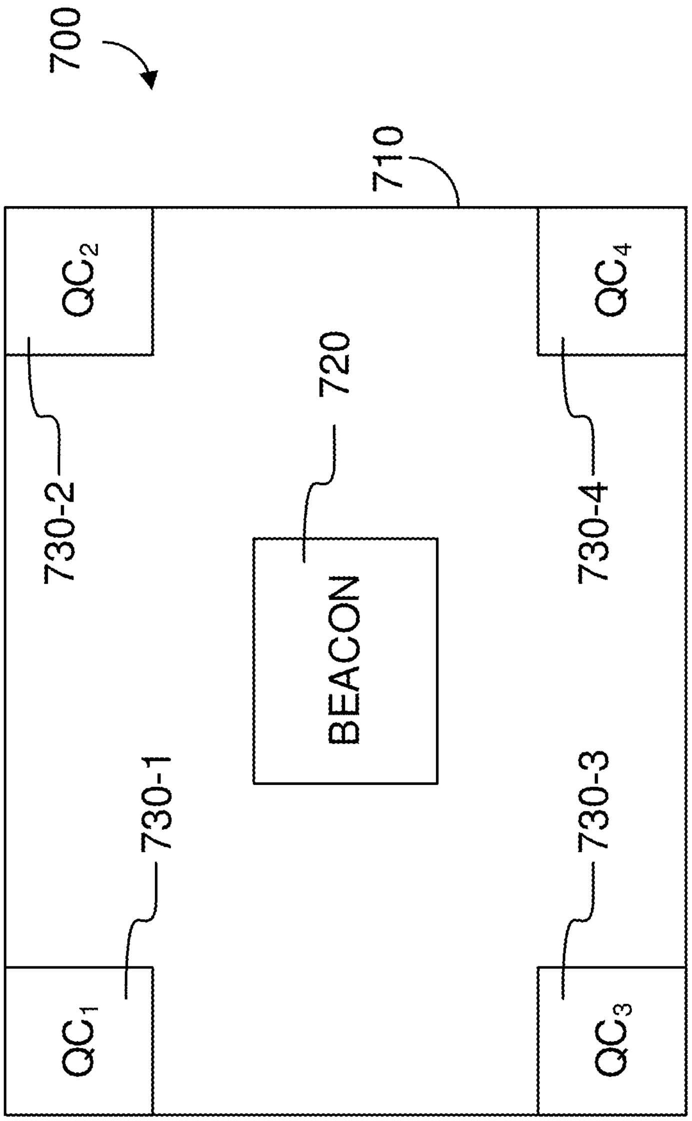
FIG. 7 is a schematic illustration of a landing site.

FIG. 7 is an example schematic illustration of a landing site 700. The landing site 700 comprises an area 710 defined as a geo-location (i.e., a location having navigation coordinates). The area 710 may include a homing beacon 720 and one or more visual cues, such as QR codes (QCs) 730-1 through 730-4. It should be noted that multiple homing beacons and other numbers of visual cues may be equally utilized.

A visual cue may be detected by an image sensor of a UAV (e.g., the UAV 100), and one or more such visual cues may be used to determine spatial alignment relative to the landing site 700. A homing beacon 720 can be further utilized to indicate to the UAV where the landing site 700 is. In some implementations, the homing beacon may transmit a different signal (or same signal on different frequencies) such that each signal transmission corresponds to communication with a unique UAV. For example, a communication circuit of a UAV may be configured to detect a certain signal transmitted by the homing beacon 720 over a first frequency (i.e. channel) and to only initiate landing when the certain signal is transmitted.

Figure 8:
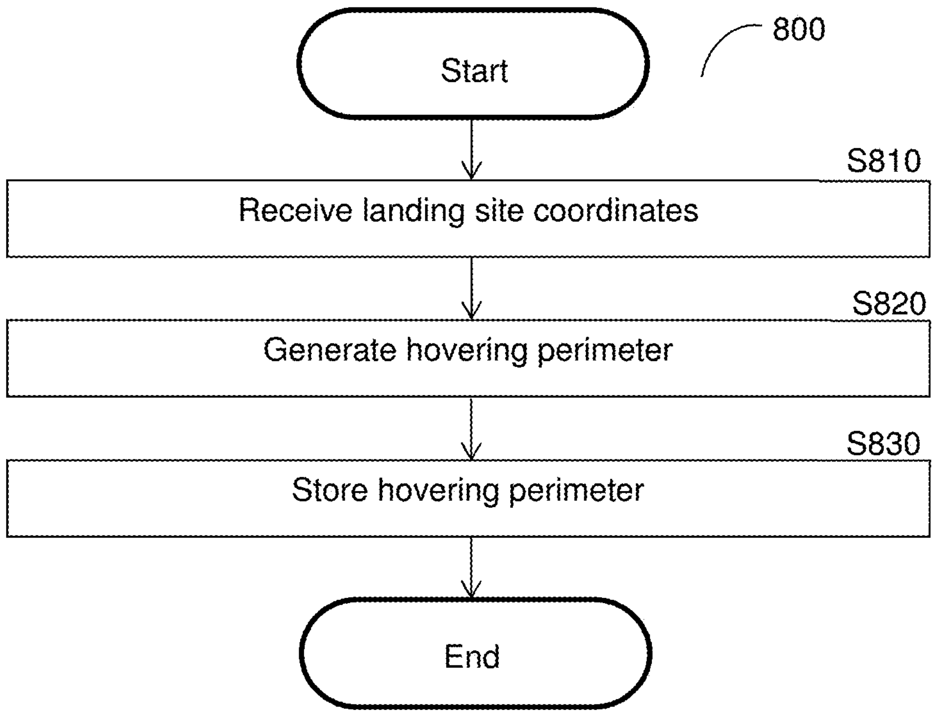
FIG. 8 is a flowchart illustrating a method for generating a hovering perimeter for a first landing site according to an embodiment.

FIG. 8 is a flowchart 800 illustrating a method for generating a hovering perimeter for a landing site according to an embodiment. In an embodiment, the method is performed by a control system configured to control UAVs (e.g., the control system 300).

At S810, coordinates of a landing site are received. Landing site coordinates may include, but are not limited to, center coordinates and radius size, point coordinates of a polygon shape, and the like, such that a geographical area may be defined as the landing site.

At S820, a hovering perimeter is generated. The hovering perimeter includes multiple hovering points, each hovering point having spatial coordinates and an approach vector. To this end, in an embodiment, S820 further includes generating the hovering points for the hovering perimeter. Hovering points may be uniquely assigned to or otherwise associated with UAVs (i.e., such that each UAV hovering in the hovering perimeter is assigned a distinct hovering point) as described herein.

The spatial coordinates may include, but are not limited to, latitude, longitude, and height. Other spatial coordinates that sufficiently identify a three-dimensional position of the hovering point to allow a UAV to arrive at that hovering point may be equally utilized. The approach vectors are assigned to hovering points such that a flight path based on the approach vector of a first hovering point does not collide with a flight path based on the approach vector of a second hovering point.

In some embodiments, a single hovering perimeter may be generated for multiple landing sites such that the hovering perimeter may be used for multiple UAVs to be landed at each one of the landing sites. In other embodiments, multiple hovering perimeters may be generated for a single landing site. Since hovering points are generated so as to take into account approach vectors that do not have overlapping flight paths, the likelihood of UAVs crashing while approaching the landing site is reduced even when communication with any of the UAVs is lost.

In an embodiment, the hovering perimeter may be generated at a distance which ensures communication between hovering UAVs and a control element of the landing site such as, but not limited to, the landing beacon 720 or the control system 300 deployed at the landing site.

In an embodiment, the hovering points may be generated based on the environment surrounding the landing site. For example, when the landing site is in an area above a populated zone, the density of hovering points should be less than in an area which is not populated.

In an embodiment, the hovering perimeter and hovering points or uses thereof may be static (i.e., constant), dynamic (i.e., changing at certain times or otherwise when certain conditions are met), or adaptive (i.e., changed in response to changes in landscape, obstacles, etc.). To this end, in a further embodiment, the hovering perimeter may be regenerated over time, for example periodically.

In a further embodiment, the hovering points may be utilized (or not) based on time of day. For example, a school may be populated during daytime on certain days of the week, but is otherwise empty on weekends and nights. To this end, one or more of the hovering points may be temporal hovering points that are active only during certain predetermined times. As an example, a temporal hovering point may not be used during nights and weekends, but may be used for times when the school is full of children.

At S830 the generated hovering perimeter is stored. The hovering perimeter may be stored on a storage of the UAV control system (e.g., the storage 330), on each UAV associated with the particular landing site of the hovering perimeter, or both. The hovering perimeter.

Figure 9:
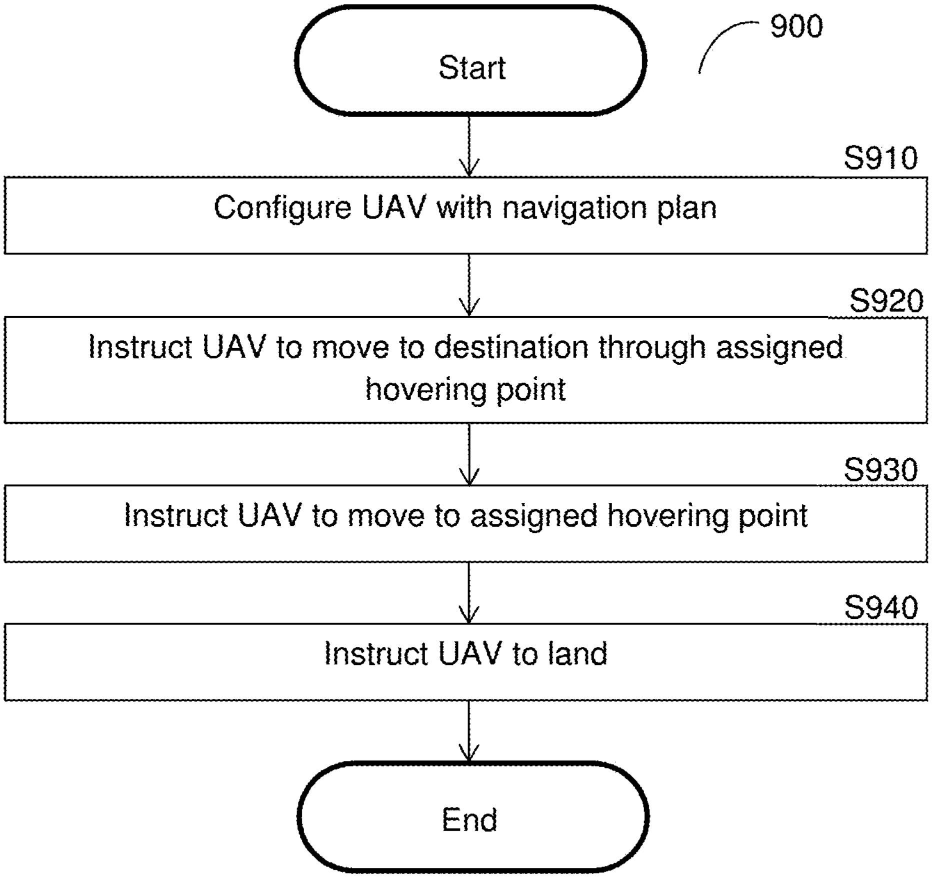
FIG. 9 is a flowchart illustrating a method for configuring a UAV to land at a landing site with a hovering perimeter according to an embodiment.

FIG. 9 is a flowchart 900 illustrating a method for configuring a UAV to land at a landing site with a hovering perimeter according to an embodiment. In an embodiment, the method is performed by the control system 300.

At S910, a UAV is configured with a navigation plan, the navigation plan includes navigating to at least an assigned hovering point of a landing site. The navigation plan may further include navigating to a destination other than the landing site, for example, a destination away from the landing site and hovering perimeter. In some embodiments, the destination may include a second hovering point of a second landing site.

At optional S920, the UAV is instructed to navigate from the landing site to the destination through the assigned hovering point, i.e., to the assigned hovering point and from the assigned hovering point to the destination. In some implementations, one or more midway points may be navigated to between the hovering point and the destination.

In certain embodiments, a first UAV control system may request a hovering point from a second UAV control system (i.e., a control system other than the control system performing the method of FIG. 9), where the second UAV control system is assigned to control airspace above a second (i.e., destination) landing site. Thus, the UAV would navigate to the hovering point assigned by the second UAV control system and await landing instructions from the destination landing site or the second UAV control system. Then the UAV would return to the assigned hovering point (at the origin landing site), and await to receive instructions to land.

At S930, the UAV is instructed by the UAV control system to approach the hovering point and to remain at the hovering point until the UAV landing is authorized. The UAV landing may be authorized when a landing sequence is established.

At S940, the UAV is instructed to land. Specifically, in an embodiment, the UAV is instructed to approach the landing site from the hovering point when the UAV is authorized to land. Landing authorization may be determined, for example, from the UAV control system, or received from an external system (e.g., a system at the landing site).

Determining the landing authorization may include determining an order for landing and ensuring that the number of UAVs landing at once is not above a threshold. To this end, S940 may further include determining or receiving a landing sequence (i.e. order in which the UAVs should land) and enforcing the landing sequence by authorizing UAVs to land when their respective orders in the landing sequence occur.

The landing sequence may be determined, for example, based on the UAV payload (priority to UAVs carrying a payload, and further prioritize according to weight of payload), based on power reserves of the UAV's battery, randomly (e.g., when no prioritization is needed or when factors considered for prioritization are otherwise equal), combinations thereof, and the like. In some implementations, a plurality of UAVs may determine a landing sequence by communicating with each other and establishing the landing sequence according to a predetermined set of rules which may be the same, or substantially the same, as those defined by the UAV control system. For example, UAVs may exchange information to determine which UAV is in more 'urgent' need of landing and prioritize that UAV over the others. Once that UAV is landed, the process continues with the UAVs in the remaining hovering points, until all UAVs have landed.

It should be noted that, in the example implementation described with respect to FIG. 9, the UAV takes off from the landing site through the hovering point to the destination, then returns from the destination to the hovering point, and finally lands at the landing site, in response to receiving authorization to do so. In some cases, a UAV may not receive landing authorization in time to land at the landing site. The UAV control system may further configure the UAV to detect when the UAV battery charge or fuel level is below a threshold, and upon determining that the charge is indeed below the threshold, initiate landing below the hovering point (i.e., to descend either directly down or near directly down from its current position). Alternatively, the UAV may send status updates (e.g., periodically) indicating, for example, fuel or power levels, and S940 may further include instructing the UAV to land when it is determined that the UAV lacks sufficient fuel or power.

By instructing the UAV to land below the hovering point when the UAV has not received authorization to land at the landing site, crashing or landing in an unknown area may be prevented by performing an emergency landing at a known point. As a result, such emergency landing allows for easier retrieval of the UAV and for safer landing than landing at an unknown location. In some embodiments, an UAV may be configured to return to the assigned hovering point upon loss of communication with an UAV control system. For example, the UAV may be configured to return to its point of origin if the UAV control system has not signaled its presence within a certain timeframe.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element At Some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for deploying multiple unmanned aerial vehicles (UAVs) with respect to a single site, comprising:

generating a hovering perimeter for a landing site, the hovering perimeter including a plurality of hovering points and a plurality of approach vectors, each hovering point having spatial coordinates and being uniquely associated with one of the plurality of approach vectors, wherein the plurality of hovering points are along the hovering perimeter, wherein a flight path based on a first approach vector of the plurality of approach vectors does not cross a flight path based on a second approach vector of the plurality of approach vectors; and configuring a first UAV of a plurality of UAVs to:

navigate to a first hovering point of the plurality of hovering points;

hover at the first hovering point; and navigate from the first hovering point to the site when the first UAV is authorized to land at the site.

2. The method of claim 1, wherein direct wireless communication is enabled between a system deployed at the site and at least one second UAV of the plurality of UAVs when each of the at least one second UAV is hovering at one of the plurality of hovering points.

3. The method of claim 1, further comprising:

configuring the first UAV to navigate from the first hovering point to a destination and to navigate from the destination back to the first hovering point.

4. The method of claim 1, wherein the hovering perimeter is a first hovering perimeter, further comprising:

generating at least one second hovering perimeter for the site.

5. The method of claim 1, wherein the first UAV is configured to navigate from the first hovering point to the site when an instruction to land the first UAV at the site is received.

6. The method of claim 1, further comprising:

configuring the first UAV to land below the first hovering point when an amount of fuel available to the first UAV is below a threshold.

7. The method of claim 6, wherein the first UAV is configured to land below the first hovering point further when an instruction to land the first UAV at the landing site has not been received.

8. The method of claim 1, further comprising:

configuring the first UAV to land below the first hovering point when an amount of power available to the first UAV is below a threshold and an instruction to land the first UAV at the landing site has not been received.

9. The method of claim 1, wherein at least one of the plurality of hovering points is at least one temporal hovering point, wherein the at least one temporal hovering point is active during at least one active time.

10. The method of claim 1, further comprising:

requesting, from a UAV control system deployed at a destination for the first UAV, a destination hovering point; and configuring the first UAV to navigate to the destination hovering point, to hover at the destination hovering point until an instruction for landing the first UAV at the destination is received, and to navigate to the first hovering point from the destination.

11. The method of claim 10, wherein the instruction for landing the first UAV at the destination is received from the UAV control system deployed at the destination.

12. The method of claim 1, wherein the first approach vector of the plurality of approach vectors is the uniquely associated approach vector for the first hovering point, wherein the first approach vector at least partially defines the flight path by which the first UAV is configured to navigate to the first hovering point.

13. The method of claim 1, wherein each UAV of the plurality of UAVs is assigned a distinct hovering point of the plurality of hovering points.

14. The method of claim 1, wherein the hovering perimeter includes a first section at a first height and a second section at a second height, wherein the first section includes the first hovering point and a first portion of the plurality of hovering points and the second section includes a second hovering point and a second portion of the plurality of hovering points, wherein the first height is greater than the second height.

15. A non-transitory computer readable medium having stored thereon instructions for causing a processing circuitry to execute a process, the process comprising:

generating a hovering perimeter for a site, the hovering perimeter including a plurality of hovering points and a plurality of approach vectors, each hovering point having spatial coordinates and being uniquely associated with one of the plurality of approach vectors, wherein the plurality of hovering points are along the hovering perimeter, wherein a flight path based on a first approach vector of the plurality of approach vectors does not cross a flight path based on a second approach vector of the plurality of approach vectors; and configuring a first UAV of a plurality of UAVs to:

navigate to a first hovering point of the plurality of hovering points;

hover at the first hovering point; and navigate from the first hovering point to the site when the first UAV is authorized to land at the site.

16. A system for deploying multiple unmanned aerial vehicles (UAVs) with respect to a single site, comprising:

a processing circuitry; and a memory, the memory containing instructions that, when executed by the processing circuitry, configure the system to:

generate a hovering perimeter for a site, the hovering perimeter including a plurality of hovering points and a plurality of approach vectors, each hovering point having spatial coordinates and being uniquely associated with one of the plurality of approach vectors, wherein the plurality of hovering points are along the hovering perimeter, wherein a flight path based on a first approach vector of the plurality of approach vectors does not cross a flight path based on a second approach vector of the plurality of approach vectors; and configure a first UAV of a plurality of UAVs to:

navigate to a first hovering point of the plurality of hovering points;

hover at the first hovering point; and navigate from the first hovering point to the site when the first UAV is authorized to land at the site.

17. The system of claim 16, wherein direct wireless communication is enabled between a system deployed at the site and at least one second UAV of the plurality of UAVs when each of the at least one second UAV is hovering at one of the plurality of hovering points.

18. The system of claim 16, wherein the system is further configured to:

configure the first UAV to navigate from the first hovering point to a destination and to navigate from the destination back to the first hovering point.

19. The system of claim 16, wherein the hovering perimeter is a first hovering perimeter, wherein the system is further configured to:

generate at least one second hovering perimeter for the site.

20. The system of claim 16, wherein the first UAV is configured to navigate from the first hovering point to the site when an instruction to land the first UAV at the site is received.

21. The system of claim 16, wherein the system is further configured to:

configure the first UAV to land below the first hovering point when an amount of fuel available to the first UAV is below a threshold.

22. The system of claim 21, wherein the first UAV is configured to land below the first hovering point further when an instruction to land the first UAV at the site has not been received.

23. The system of claim 16, wherein the system is further configured to:

configure the first UAV to land below the first hovering point when an amount of power available to the first UAV is below a threshold and an instruction to land the first UAV at the site has not been received.

24. The system of claim 16, wherein at least one of the plurality of hovering points is at least one temporal hovering point, wherein the at least one temporal hovering point is active during at least one active time.

25. The system of claim 16, wherein the system is further configured to:

request, from a UAV control system deployed at a destination for the first UAV, a destination hovering point; and configure the first UAV to navigate to the destination hovering point, to hover at the destination hovering point until an instruction for landing the first UAV at the destination is received, and to navigate to the first hovering point from the destination.

26. The system of claim 25, wherein the instruction for landing the first UAV at the destination is received from the UAV control system deployed at the destination.

27. The system of claim 16, wherein the first approach vector of the plurality of approach vectors is the uniquely associated approach vector for the first hovering point, wherein the first approach vector at least partially defines the flight path by which the first UAV is configured to navigate to the first hovering point.

* * * * *